(12) United States Patent
Balestri et al.

(10) Patent No.: US 7,680,275 B1
(45) Date of Patent: Mar. 16, 2010

(54) METHOD AND SYSTEM FOR THE CONTROLLED DELIVERY OF DIGITAL SERVICES, SUCH AS MULTIMEDIA TELEMATICS SERVICES

(75) Inventors: Massimo Balestri, Turin (IT); Gianluca De Petris, Pescara (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 09/354,080

(22) Filed: Jul. 15, 1999

(30) Foreign Application Priority Data

Aug. 11, 1998 (IT) .............................. TO98A0705

(51) Int. Cl.
*H04N 7/167* (2006.01)
(52) U.S. Cl. ...................................................... 380/201
(58) Field of Classification Search ................. 380/204, 380/210, 221, 239, 44, 201, 202, 203; 713/200, 713/201, 202, 164, 191, 189, 193; 726/1, 726/6, 27
See application file for complete search history.

(56) References Cited

U.S. PATENT DOCUMENTS

| | | | |
|---|---|---|---|
| 5,539,823 A * | 7/1996 | Martin | 380/222 |
| 5,623,637 A * | 4/1997 | Jones et al. | 711/164 |
| 5,627,892 A | 5/1997 | Kauffman | |
| 5,933,501 A * | 8/1999 | Leppek | 380/259 |
| 6,035,038 A * | 3/2000 | Campinos et al. | 380/228 |
| 6,055,314 A * | 4/2000 | Spies et al. | 380/228 |

(Continued)

FOREIGN PATENT DOCUMENTS

| | | |
|---|---|---|
| EP | 0 817 485 A1 | 1/1998 |
| EP | 0 982 935 | 3/2000 |
| JP | 63 220630 | 9/1988 |
| JP | 64 049446 | 2/1989 |
| JP | 09 212457 | 8/1997 |
| JP | 10 207362 | 8/1998 |

(Continued)

OTHER PUBLICATIONS

Newton, Newton's Telecom Dictionary, 1998, Telecom Books, 14, pp. 717 and 553.*

(Continued)

*Primary Examiner*—Beemnet W Dada
(74) *Attorney, Agent, or Firm*—Finnegan, Henderson, Farabow, Garrett & Dunner, L.L.P.

(57) ABSTRACT

The services delivered by a plurality of providers (SP) towards the users (U) are identified by respective streams of encoded data, for instance MPEG data. The users (U) are provided with respective receiving means (STB) of a generalised type, common to all users. Each user is provided with a user unit (105), preferably embodied in the form of a smart card, incorporating a processing function (VM) able to recognize, load and execute at least one enabling algorithm embedded in the data streams sent by the providers, by exploiting a respective identifying code, also embedded in the delivered data stream, to enable to receiving means, through the user unit (105), to make use of the respective service.

13 Claims, 2 Drawing Sheets

U.S. PATENT DOCUMENTS

| | | | | |
|---|---|---|---|---|
| 6,058,478 | A | * | 5/2000 | Davis .......................... 713/191 |
| 6,108,422 | A | * | 8/2000 | Newby et al. ................. 380/47 |
| 6,141,339 | A | * | 10/2000 | Kaplan et al. .......... 370/395.61 |
| 6,157,719 | A | * | 12/2000 | Wasilewski et al. ......... 380/210 |
| 6,351,536 | B1 | * | 2/2002 | Sasaki ......................... 380/44 |
| 6,671,810 | B1 | * | 12/2003 | Jardin ........................ 713/201 |

FOREIGN PATENT DOCUMENTS

| | | |
|---|---|---|
| WO | WO 96/08912 | 3/1996 |
| WO | WO 97/04553 | 2/1997 |
| WO | WO 97/26733 | 7/1997 |

OTHER PUBLICATIONS

Giachetti et al., "A Common Conditional Access Interface For Digital Video Broadcasting Decoders", IEEE Transactions, vol. 41, No. 3, pp. 836-841 (1995).

Futro, "Smart Card For Conditional Access: A Marketing And Security Tool", Proceedings of the Intl. Television Symposium and Technical Exhibition, vol. Symp. 18, pp. 733-742 (1993).

Peyret et al., "Smart Cards Provide Very High Security And Flexibility In Subscribers Management", IEEE Transactions On Consumer Electronics, vol. 36, No. 3, pp. 744-752 (1990).

* cited by examiner

METHOD AND SYSTEM FOR THE CONTROLLED DELIVERY OF DIGITAL SERVICES, SUCH AS MULTIMEDIA TELEMATICS SERVICES

FIELD OF THE INVENTION

The present invention relates to the controlled delivery of digital services such as multimedia telematics services, and it has been developed with particular attention to its possible application within the so-called OPIMA (Open Platform Initiative for Multimedia Access) initiative.

A description of the purposes and criteria that regulate this initiative is available as of the filing date of this application on the Internet site www.cselt.it/ufv/leonardo/opima.

Further context information can be found for instance in the CENELEC EN 50221 standard, titled "DVB Common Interface Specification for Conditional Access and other Digital Video Broadcasting Decoder Applications", or in document DAVIC 1.3 Part 10: "Basic Security Tools for Davic 1.3", published in November 1997 on CDROM available from the DAVIC secretariat c/o Society Italiana Avionica S.p.A., Strada Antica di Collegno, 235, 1-10146 Torino (Italy).

The invention however can find application in all the situations wherein a system is to be made that is able to allow a user to access, with a single decoder, coded information from different providers. The invention therefore can be employed in digital broadcast services via satellite or cable, for instance for the delivery of fee payment audio-visual contents, even of interactive nature. A system according to the invention can be embodied within a decoder of the kind currently called Set Top Box (STB), within a personal computer, or integrated directly, for instance, in a receiver such as a television receiver with digital interface.

Within this context, solutions have already been proposed and tested wherein access to the information (typically a television program) requires the availability, at the user's premises, of a decoder device, essentially of a kind which is proprietary of the service provider. In other words, a certain decoder device allows receiving only the programs transmitted by a certain service provider or, at most, by a limited number of providers adopting the same methods for delivering the services.

In general, to gain access to different providers, the user is however forced to obtain a multiplicity of different devices, using one or another device as the case may be.

Attempts to attain a certain degree of standardization have already been made, for instance through the definition, by the DAVIC International Forum, of the so-called CAO interface and especially through the definition of the so-called CA1 interface, illustrated in detail in the DAVIC 1.3 document mentioned above.

Essentially, the aforesaid two interfaces operate at the two levels indicated respectively with dashed and dotted lines in the diagram in FIG. 1, which is intended to illustrate both prior art solutions and the solution according to the invention.

In that diagram the reference characters SP and U indicate respectively a provider of information services and a user thereof.

These services can be different information services, including (by way of non limiting example): audio and/or television programs, in particular delivered according to different request and payment procedures, added value services, advertising services, also with prizes, services delivered upon subscription or coupon-based, various information services (banking and stock trading, road traffic, location, etc.), games, software distribution, remote sales, remote banking services and statistical survey services, which also may be of an interactive nature.

In the diagram in FIG. 1, the reference D indicates the medium (broadcast via cable, via satellite, atmospheric, in a dedicated network, on Internet, etc.) through whirl the information generated by the provider SP reaches the reception system STB of the user U.

In the aforementioned DAVIC 1.3 standard, this information is already present in the form of an MPEG (acronym of Moving Picture Expert Group), data stream in particular as a stream encoded according to standard ISO/IEC 13818 (MPEG-2). Messages known as ECM and EMM, respectively, are inserted into this stream. The ECM acronym, which stands for Entitlement Control Message, identifies the control messages associated to a service. The EMM acronym, which stands for Entitlement Management Message, identifies instead the messages for managing the access authorizations for services associated with a user.

Unit STU (i.e. Set Top Unit, which together with the security block indicated in its entirety as SD constitutes the receiving system STB available to user U) comprises in the first place a receiver block 100 destined to perform reception at the hardware level (demodulation, synchronization, etc.) of the incoming data stream. The latter is destined to be sent to the block SD and in particular towards a filter 101 and a deciphering or decrypting block 102.

The signals sent according to the MPEG standard can be encrypted, thereby allowing them to be read in clear only by users enabled with an appropriate key.

The decrypting function is driven, within the unit STU, by the management module 103 which, through a respective control interface, sends instructions towards a module 104. The latter acts, within the block SD, as a so-called Security Manager. In practice, the function of the module 104 is to interact with the filter 101, with the deciphering or decrypting module 102 and with a user unit 105 to deliver towards the module 102 a deciphering key such as to allow the module 102 itself to decipher the incoming signal from the receiver 100. This signal can thus be rendered in clear and transferred to a demultiplexer 106 and to a decoder 107 (or to an equivalent processing chain) contained in the unit STU, in view of delivery to the user U.

In the more traditional systems mentioned above (of the kind implementing the so-called CAO interface in current DAVIC terminology), the standardization of the reception system STB in respect of the various SP service providers is limited to the unit STU alone.

All items below the dashed and dotted line which in FIG. 1 identifies the interface CAO constitute a part of device specialized according to a given service provider.

Adoption of the interface CA1 allows standardizing the unit SD as well, shifting the need for specialization to a lower level, i.e. the one of the user unit 105 which is to be made in removable form, in particular in the form of a so-called "smart card".

However, even the smart card construction fails to solve the problems summarized above, but simply transfers them to a different level. The user who desires to receive information from different providers SP will generally have to obtain many user units 105, thus many different smart cards, one for each provider. In addition to having to obtain multiple smart cards, the user should in any case reconfigure his reception system on each occasion depending on the provider of the services to be received, for instance by inserting the corresponding smart card into the system.

The rather impractical nature of such an operating procedure is evident, especially considering that in a scenario like the one of the OPIMA initiative the intent is to provide the user with procedures for selecting the provider SP that are substantially similar to those normally adopted when receiving television programs: in practice, the possibility of choosing provider and service through a simple action performed on a remote control set.

At least in principle, the drawbacks summarized above could be solved by providing for the insertion of multiple user units 105 in the reception system.

However, even independently of any consideration about the complexity of the system, this solution would still not solve the problem linked to the need, for the user, to obtain multiple user units 105.

OBJECT OF THE INVENTION

The object of the present invention therefore is to provide a solution that is able to avoid the drawbacks summarized above, in particular in relation to the possible adoption of the interfaces CAO and CA1, while retaining general features of conformity with such interfaces.

SUMMARY OF THE INVENTION

According to the present invention, this aim is attained thanks to a method for service delivery within a plurality of providers and users, wherein the services are identified by respective stream of encoded data emitted by the providers and the users are provided with reception means to receive the data streams, the reception means being selectively enabled to make use of determined services through a respective user unit. The method comprises the steps of:

incorporating into the coded data streams at least one algorithm for enabling the use of respective determined services, incorporating into the coded data streams a respective identifying code for each user to be enabled to receive a certain service, and associating to the user unit a processing function capable recognizing and executing the at least one enabling algorithm by exploiting the identifying code, to enable the receiving means of the respective user to make use of the service.

The method can comprise the operation of configuring the user unit as a movable processing support uniquely assigned to one of the users and arranged to be selectively associated to the reception means, the reception means being of a generalized type common to multiple users of the plurality of users.

The operation of configuring the movable processing support can use a smart card.

According to a feature of the invention, the method comprises the following operations:

associating to the reception means a trusted middleware function, configuring the trusted middleware function into a static part, residing on the reception means, and a dynamic part arranged to be selectively transferred onto the user unit in view of the execution of the algorithm by the processing function.

The method can comprise the following operations:

configuring the data streams as MPEG data streams containing EMM messages, inserting the identifying code in to the EMM messages, activating, through the user unit (105) and upon reception of the algorithm, the performance of the following functions:

extracting, reading and deciphering the EMM messages contained in the data stream received, interpreting the identification code contained in the EMM messages, executing the at least one enabling algorithm by exploiting the identification code.

The enabling algorithm can be incorporated in a stream of private data within the data stream. Upon reception of the algorithm, the processing function (VM) enables the reception means to operation as transmitters to transmit information about the delivery of the service itself.

The invention further concerns the related system. More particularly, the system for the controlled delivery of digital services by a plurality of providers to a plurality of users comprises:

providers arranged to incorporate into the respective encoded data streams at least one algorithm for enabling use of respective determined services, as well as to incorporate into the encoded data streams a respective identification code for each user to be enabled to receive a determined service, and user units which have associated thereto a processing function arranged to recognize and execute the at least one algorithm on the basis of the identifying code, to enable the receiving means of the respective user to make use of the service.

The user units are configured as removable processing supports uniquely assigned each to one of the users and arranged to be selectively associated to the receiving means, the receiving means being of a generalized type common to multiple users of the plurality of users.

The receiving means have associated thereto a trusted middleware function configured in a static part, residing on the receiving means, and in a dynamic part arranged to be selectively transferred on the respective user unit in view of the execution of the algorithm by the processing function.

The service providers emit the data streams as MPEG data streams containing EMM messages with the identifying code inserted in the EMM messages, and the receiving means can comprise:

means for extracting, reading and deciphering the EMM messages contained in the received data stream, means for interpreting the identifying code contained in the EMM messages, and processing means to execute the at least one enabling algorithm on the basis of the identifying code.

The service providers can incorporate the enabling algorithm into a stream of private data within the data streams.

The receiving means can be activated by the user unit upon reception of the at least one algorithm for operation as transmitters to transmit information about the delivery of the service itself.

The user unit is configured as a Java Card.

BRIEF DESCRIPTION OF THE DRAWING

The invention shall now be described, purely by way of non limiting example, with reference to the enclosed drawing, wherein.

SPECIFIC DESCRIPTION

Figure 1:
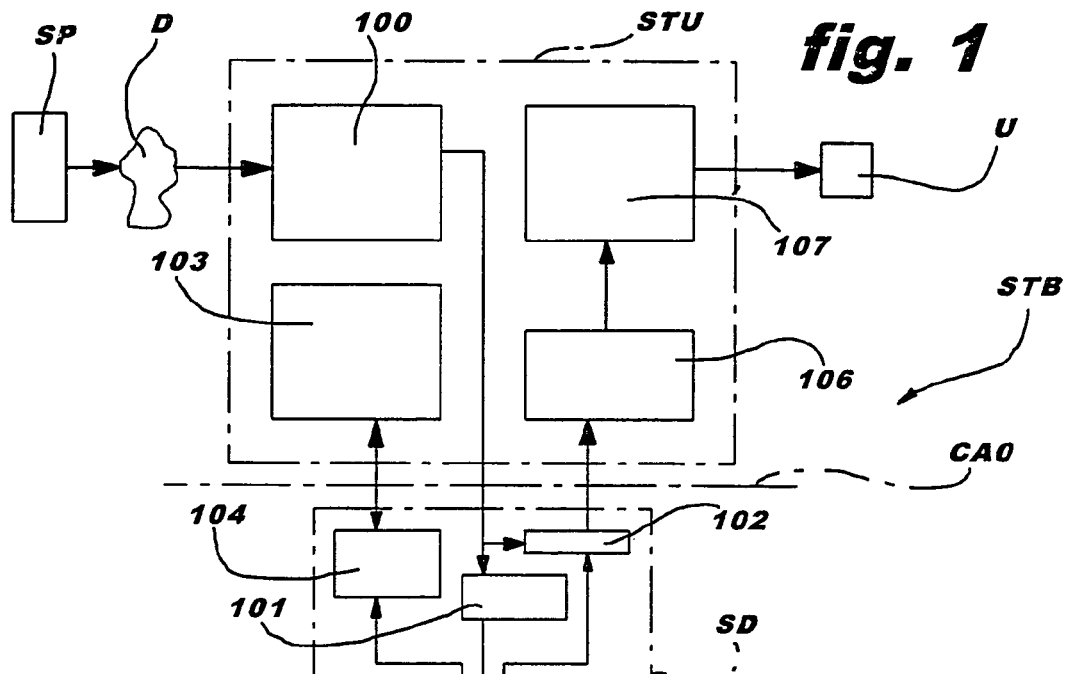
FIG. 1, representative—in general terms—also of prior art solutions, has already been examined above.
Figure 2:
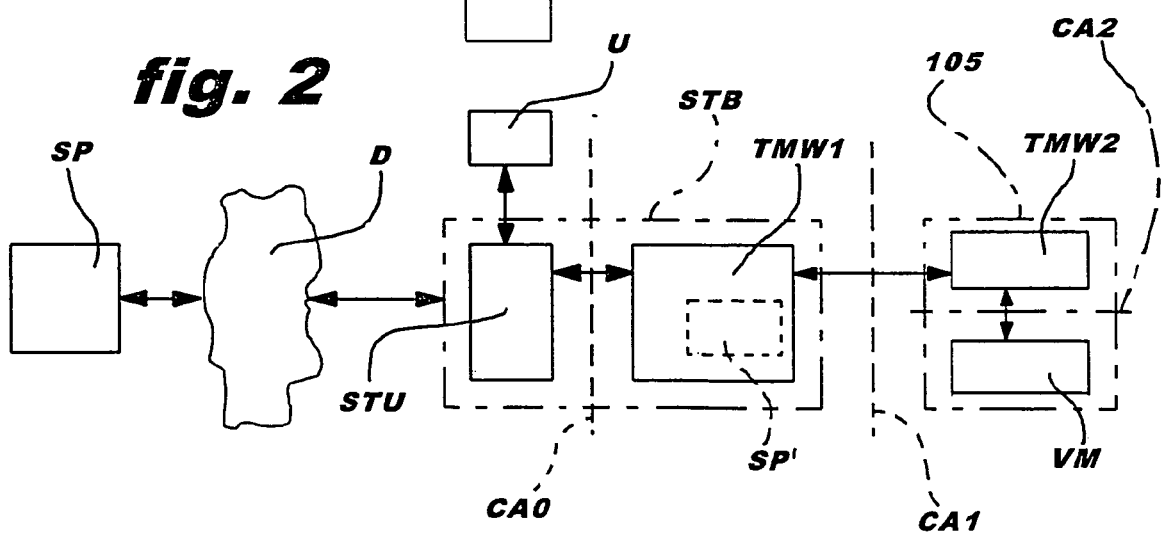
FIG. 2 shows, in the form of a functional block diagram corresponding to the OPIMA Reference Model, a possible embodiment of the invention.

In FIG. 2, elements identical or corresponding with those already described with reference to FIG. 1 are indicated with the same references as in FIG. 1. This applies in particular to the service provider SP, the delivery channel D towards the user I), the unit STU and the ideal location of the interfaces CAO and CA 1.

All of the functions shown with reference to FIG. 1 referring to the modules 101, 102, 104 is carried out, in the diagram according to the invention of FIG. 2, by a set of elements represented by the blocks TMW1, TMW2 and VM. The TMW acronym used for both blocks TMW1 and TMW2 indicates the fact that these block:, are normally realized at the level of the so-called "trusted middleware" (i.e. a software that performs security functions).

Briefly, the solution according to the invention can be seen as a development of the solution based on the interface CA1. In the solution according to the invention the smart card 105, in addition to containing a cryptographic key that is not modifiable or legible from the outside, is able to receive, verify, store and execute an algorithm that allows using the services delivered by a given provider.

The verification phase series for checking the authenticity and integrity of the algorithm before it is stored in the smart card, and it is based on checking a digital encrypted signature made by a Certification Authority recognized by service providers and by smart card manufacturers.

The execution of the service provider's specific algorithm allows deciphering the proprietary EMM/ECM messages of the service provider and to feed the deciphering module 102 which places the services required by the user in clear, thereby allowing their utilization.

In this way the user will no longer need to obtain multiple units 105 in order to receive information from different providers.

According to the invention it is sufficient to have, for instance, a single universal smart card available, and specialization information, necessary to receive a given provider's information in clear, can be downloaded directly from the system into the smart card, by exploiting its capability to execute the downloaded programs through its chip, and the software layer associated thereto, represented here as a virtual machine VM.

This gives the provider the further possibility to control and verify that a particular user actually has been enabled to receive certain programs. Only after a givers user has actually registered (for instance through a subscription) within the set of users authorized to receive a given service does the provider transmit the information that, processed at the level of smart card 105 level, allows the user to receive the service.

From the above it is readily apparent that, although it is preferred (for reasons better explained below) to embody the invention at the level of a movable support such as a smart card, the same function can be performed in a different way, for instance in the form of a circuit function comprised within the user system STB.

Unlike the interfaces CAO and CA1 described above, which are intrinsically physical layer interfaces, the solution according to the invention is suitable for implementation at the programming layer, in particular by means of a smart card, such as, for instance, a so-called Java Card.

The terms "Java" and "Java Card" are registered trademarks of Sun Microsystems. The related description, in particular in regard to the definition of so called APIs (the acronym stands for Application Programming Interface) is publicly available, as of the filing date of this application, at the Internet site with the URL java.sun.com/products/javacard.

From this point of view, the solution according to the invention can be identified as a new interface layer, indicated in FIG. 2 as CA2 for the sake of consistency with the references CAO and CA1 used above, corresponding in practice to an intermediate layer of the user unit 105. In practical terms, the solution according to the invention provides for the so-called "trusted middleware" specified by the OPIMA reference model to be subdivided into a static part TMW1, included, according to the solution shown in FIG. 2, within the STB module, and a dynamic part TMW2, included within the user unit 105.

The set of functions represented by TMW1 comprises, in particular, a module SP' whose function is essentially to extract a specific algorithm of the provider SP starting from the MPEG data stream coming from the receiver 100 (FIG. 1) to load it into the user unit 105 as a specific part. Preferably, this algorithm is included as a private data stream in accordance with the aforementioned ISO/IEC 13818 standard.

The remaining part in the set of functions TMW1 comprises the de-scrambler 102 and the related functions represented by the modules 101 and 104 in the diagram in FIG. 1. The set of parts and functions TMW1 therefore is fully defined and wholly independent of the provider SP involved on the particular occasion and consequently is of a standardized type. In practice, the function indicated as TMW2 is identified by a specific algorithm of the individual provider SP which algorithm is downloaded into the user unit 105 in a secure manner (for instance because it is provided with cryptographic key) through the function SP'.

In this way the downloaded algorithm can be executed in the user unit 105 in a secure environment, thanks to the well known manipulation resisting features of smart cards.

This explains why, although in principle it can be embodied also by employing a circuit or a function incorporate in the user system STB, the solution according to the invention is preferably carried out at the level of a user unit 105 consisting of a smart card. This choice also allows an easy replacement of a smart card which may have been damaged or altered.

In use, when the user U chooses a particular provider SP (this can be done through a normal selection operation effected by acting on a remote control set) a so called applet generated by the provider SP is transferred through the system STB for being loaded into the respective unit 105. As is well known, the term "applet" indicates a set of Java instructions that implements a given algorithm. Broadcast may take place, for instance, in case of radio broadcast transmission, by exploiting the carousel configuration adopted for broadcasting MPEG-2 DSM-CC (Digital Storage Media Command Control Data). In this way, within the function TMW1, the filter 101 (FIG. 1) is programmed in view of extracting the EMM data, specific for the individual user enabled.

The EMM messages can thus be read and deciphered in view of interpreting the data contained in the ECM messages. It is therefore possible to proceed with the extraction of the deciphering key CW relating to the service, which key is sent towards the de-scrambler 102, in order to allow the user U to receive the service through the demultiplexer 106 and the decoder 107.

Of course, it is also possible to envision additional functions, such as the one that provides for the secure transfer towards the provider SP of specific information about the service delivered, such as information pertaining to the usage of the service request.

Figure 3:
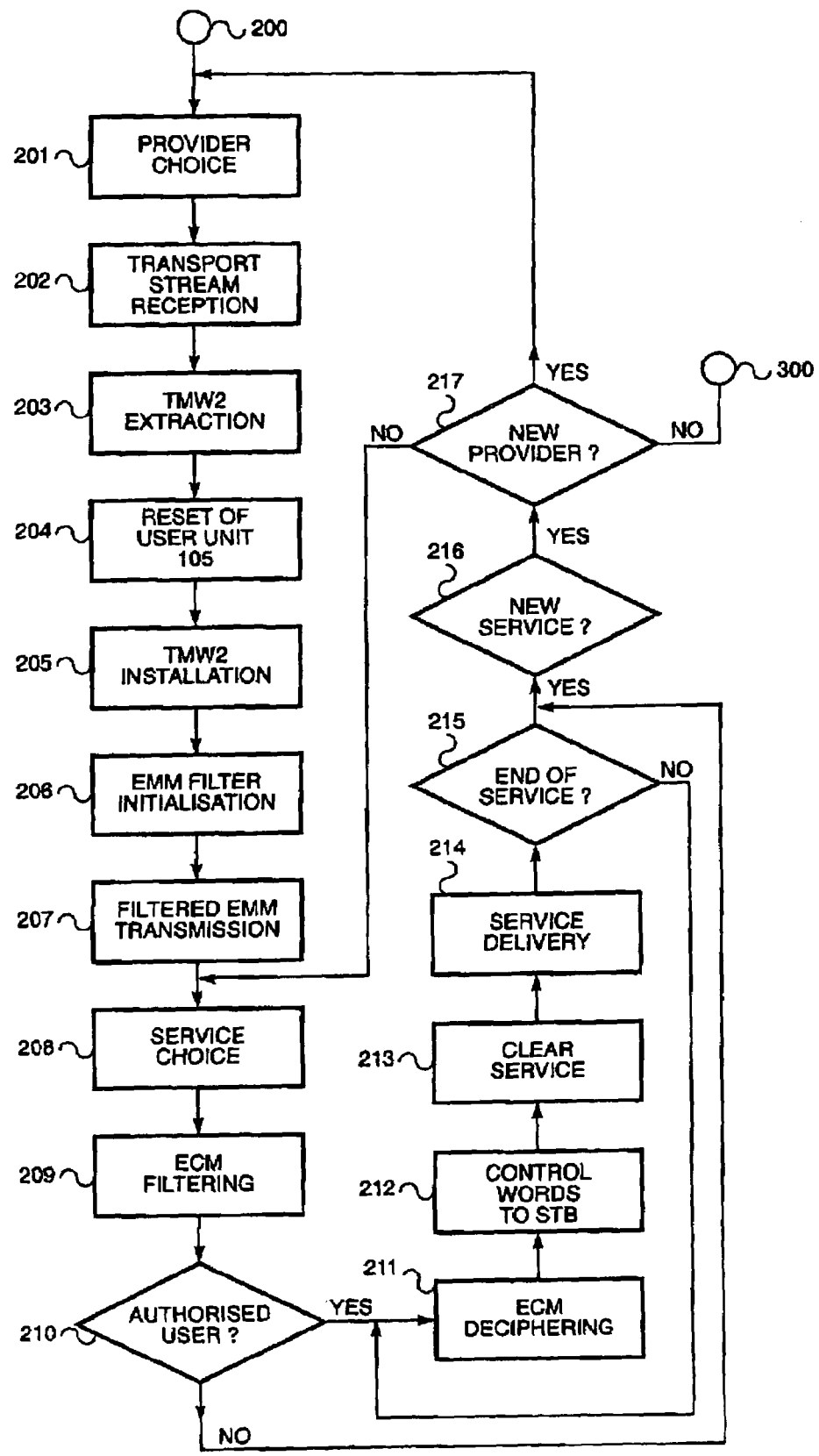
FIG. 3 shows, in the form of a flowchart, a possible operating sequence of a system according to the invention.

A specific example of operation according to the general criteria outlined above is shown in the flowchart of FIG. 3.

Starting from an initial step 200, the step indicated as 201 represents the choice of a particular provider SP by the user. This step can be effected, for instance, by tuning—in a way known in itself—the system STB on a certain frequency. As a result (step, 202) the system STB starts receiving the data transport stream, for instance in the MPEG-2 format, transmitted by the provider SP.

The step 203 represents the extraction of the function TMW2 (of the dynamic type, by the function SP. After resetting (in the step 204) the user unit 105, in the subsequent step 205 the system STB loads thereinto (for instance as a Java Card applet) the function TMW2. The system STB then requests (step 206) the same unit 105, and in particular the virtual machine part VM which is able to process the extracted data, how to initialize the filter function, represented by the block 101 in FIG. 1.

At this point (step 207) the system STB starts sending towards the user unit the filtered EMM data thereby completing the enabling of the provider/user communication. The user can then choose (step 208) the desired service. At this point the system STB starts filtering the ECM signals associated to the chosen service sending them towards the user unit 105 where it is checked (step 210) whether the user is authorized to access the service.

If the outcome is negative (unauthorized user), the operation progresses to another phase whereby another service may be chosen (step 216, to be illustrated farther on).

If, on the contrary, the user is found to be authorized (positive outcome of the comparison step 210) because he is registered as such with the provider SP, particularly in relation to the selected service, the ECM data are deciphered by the unit 105 (step 211) and the respective control words are returned towards the system STB (step 212).

In this way the function TMW1 (static) of the system STB is able to decipher the service bringing it into the clear (step 213) in view of its delivery to the user (step 214) through the modules 106 and 107.

The step 215 is aimed at verifying whether the user, by applying a command (for instance imparted through a remote control set) to the system STB, expressed the will to in Cerrupt use of the service or whether the service itself has ended.

If this is not the case (negative outcome of the step 215) the operation returns upset learn of the step 211, with the possibility of taking into account a possible periodic variation of the deciphering key CW.

In case of positive outcome of the step 215, a subsequent step 216 is the verification as to whether the user intends to make use of a new service. As stated previously, the operation can evolve towards the step 216 also in case of negative outcome of the step 210, thereby allowing a user, who is not authorized to make use of a pertain service, to choose a different service.

The negative outcome of the step 216 causes the evolution towards an end phase 300. It will be appreciated that this does not usually correspond to an actual turning off of the system STB but only to its reaching an idle state.

The positive outcome of the step 216 determines the return to the step 201 for the selection of a new provider or to the step 208 for the selection of a new service delivered by the same provider utilized previously, upon the outcome of a corresponding selection step 217.

Naturally, while the principle of the invention remains valid, the implementation details and the embodiments can be widely varied with respect to the description and illustration provided herein, without thereby departing from the scope of the present invention as defined in the claims that follow.

The invention claimed is:

1. A method for the controlled delivery of digital services by a plurality of providers to a user, wherein said services are identified by respective stream of encoded digital data emitted by said plurality of providers and the user is provided with a receiver and a single removable user unit to receive said digital data streams by said plurality of providers, the receiver being selected to make use of determined services of a given provider of said plurality, the method comprising the steps of:
    incorporating by each of said plurality of providers into said digital data streams a respective enabling algorithm generated by the provider and specific of the provider for the use of respective determined services of said plurality of providers,
    incorporating into said digital data streams respective identifying codes of selective users to receive said determined services,
    selectively loading said enabling algorithm of at least two of the plurality of providers in said digital data streams into the user unit of at least one of the selective users based on the respective identifying codes and wherein said enabling algorithms of at least two of the plurality of providers are concurrently available on the user unit for the at least one of the selective users to make use of said respective determined services of said at least two of the plurality of providers,
    associating to said user unit a processing function for recognizing and executing said enabling algorithm based on said identifying codes for the receivers of the selective users to make use of said respective determined services of said plurality of providers;
    associating to said receiver a trusted middleware function,
    configuring said trusted middleware function into a static part, residing on said receiver, and a dynamic part arranged to be selectively transferred onto single removable user unit in view of the execution of said respective enabling algorithm by said processing function.

2. The method according to claim 1, which comprises the step of configuring said single removable user unit as a movable processing support uniquely assigned to said users.

3. The method according to claim 1, which comprises the step of configuring said single removable user unit as a smart card.

4. The method according to claim 1, which comprises the steps of:
    configuring said digital data streams as MPEG data streams containing EMM messages,
    inserting said identifying code in to the EMM messages,
    activating, through said single removable user unit and upon reception of said respective enabling algorithm, the performance of the following functions:
    extracting, reading and deciphering the EMM messages contained in the digital data stream received,
    interpreting said identification code contained in the EMM messages, executing said enabling algorithm by exploiting said identification code.

5. The method according to claim 1, wherein said respective enabling algorithm is incorporated in to a stream of private data within said digital data stream.

6. The method according to claim 1, wherein upon reception of said enabling algorithm, said processing function causes said receiver to operation as transmitters to transmit information about the delivery of the service itself.

7. A system for the controlled delivery of digital services by a plurality of providers to a user, wherein said services are identified by respective coded digital data streams and the user is provided with a receiver and a single removable user unit to receive said digital data streams delivered by said plurality of providers, the receiver being selected to make use of respective determined services of a given provider, wherein:
    each of said plurality of providers is arranged to incorporate into said digital data streams respective enabling algorithm generated by the provider for using said respective determined services of said plurality of providers, as well as respective identification codes of selective users to receive said respective determined services, wherein the respective enabling algorithm of at least two of the plurality of providers in said digital data streams is selectively loaded into the user unit of at least one of the selective users based on the respective identification codes and wherein said enabling algorithms of at least two of the plurality of providers are concurrently available on the user unit for the at least one of the selective users to make use of said respective determined services of said at least two of the plurality of providers, said single removable user unit has associated thereto a processing function arranged to recognize and execute said respective enabling algorithm on the basis of said identifying code, to make use of said respective determined services of said plurality of providers; and said receiver have associated thereto a trusted middleware function configured in a static part, residing on said receiver, and in a dynamic part arranged to be selectively transferred on the single removable user unit in view of the execution of said respective enabling algorithm by said processing function.

8. The system according to claim 7, wherein said single removable user unit is configured as a removable processing supports uniquely assigned to said user.

9. The system according to claim 7, wherein said single removable user unit is configured as a smart card.

10. The system according to claim 7, wherein said service providers emit said digital data streams as MPEG data streams containing EMM messages with said identifying code inserted in said EMM messages, and said receiver comprises:
  modules for extracting, reading and deciphering the EMM messages contained in the received digital data stream,
  modules for interpreting said identifying code contained in the EMM messages, and
  processing modules to execute said at least one respective enabling algorithm on the basis of said identifying code.

11. The system according to claim 7, wherein each of said plurality of providers incorporates said respective enabling algorithm into a stream of private data within said digital data streams.

12. The system according to claim 7, wherein the receiver can be activated by said single removable user unit upon reception of said respective enabling algorithm for operation as a transmitter to transmit information about the delivery of the service itself.

13. The system according to claim 7, wherein said single removable user unit is configured as a Java Card.

* * * * *